United States Patent [19]

Chadwick

[11] 4,197,060

[45] Apr. 8, 1980

[54] HEAT-POWERED WATER PUMP

[75] Inventor: Duane G. Chadwick, Logan, Utah

[73] Assignee: Utah State University Foundation, Logan, Utah

[21] Appl. No.: 892,004

[22] Filed: Mar. 31, 1978

[51] Int. Cl.² ............... F04B 17/00; F03G 7/02; F03G 7/06
[52] U.S. Cl. .................... 417/379; 60/531; 60/541
[58] Field of Search ............... 417/375, 379; 60/641, 60/531

[56] References Cited

U.S. PATENT DOCUMENTS

| | | | |
|---|---|---|---|
| 1,780,336 | 11/1930 | Canton | 417/394 |
| 2,212,281 | 8/1940 | Ullstrand | 62/118 |
| 2,688,923 | 9/1954 | Bonaventura et al. | 60/641 X |
| 2,755,745 | 7/1956 | Lewis | 417/379 |
| 2,867,974 | 1/1959 | Wenander | 417/379 |
| 2,918,219 | 12/1959 | MacCracken | 417/379 X |
| 3,309,012 | 3/1967 | Booth et al. | 417/394 X |
| 3,937,599 | 2/1976 | Thureau et al. | 417/379 X |
| 4,089,325 | 5/1978 | Brola | 60/641 X |

FOREIGN PATENT DOCUMENTS

| | | | |
|---|---|---|---|
| 635283 | 3/1928 | France | |
| 1036504 | 9/1953 | France | 417/379 |
| 158478 | 4/1957 | Sweden | 417/379 |

Primary Examiner—Leonard E. Smith
Attorney, Agent, or Firm—J. Winslow Young; H. Ross Workman; Rick D. Nydegger

[57] ABSTRACT

A heat-powered water pump including a flexible diaphragm as the pumping element with a volatile liquid as a working fluid. The flexible diaphragm is enclosed within a vessel and isolates the working fluid from the water to be pumped. One-way valves control the direction of water flow through the pump. A U-shaped siphon tube acts as a temporary reservoir for the pumped water and is siphoned empty after being filled. A portion of the water siphoned from the U-shaped siphon tube is recirculated through the vessel in heat exchange relationship with the working fluid to condense the working fluid. A reservoir of warm water is maintained in thermal contact with the flexible diaphragm to minimize condensation of the working fluid by thermal contact with the water through the diaphragm.

14 Claims, 1 Drawing Figure

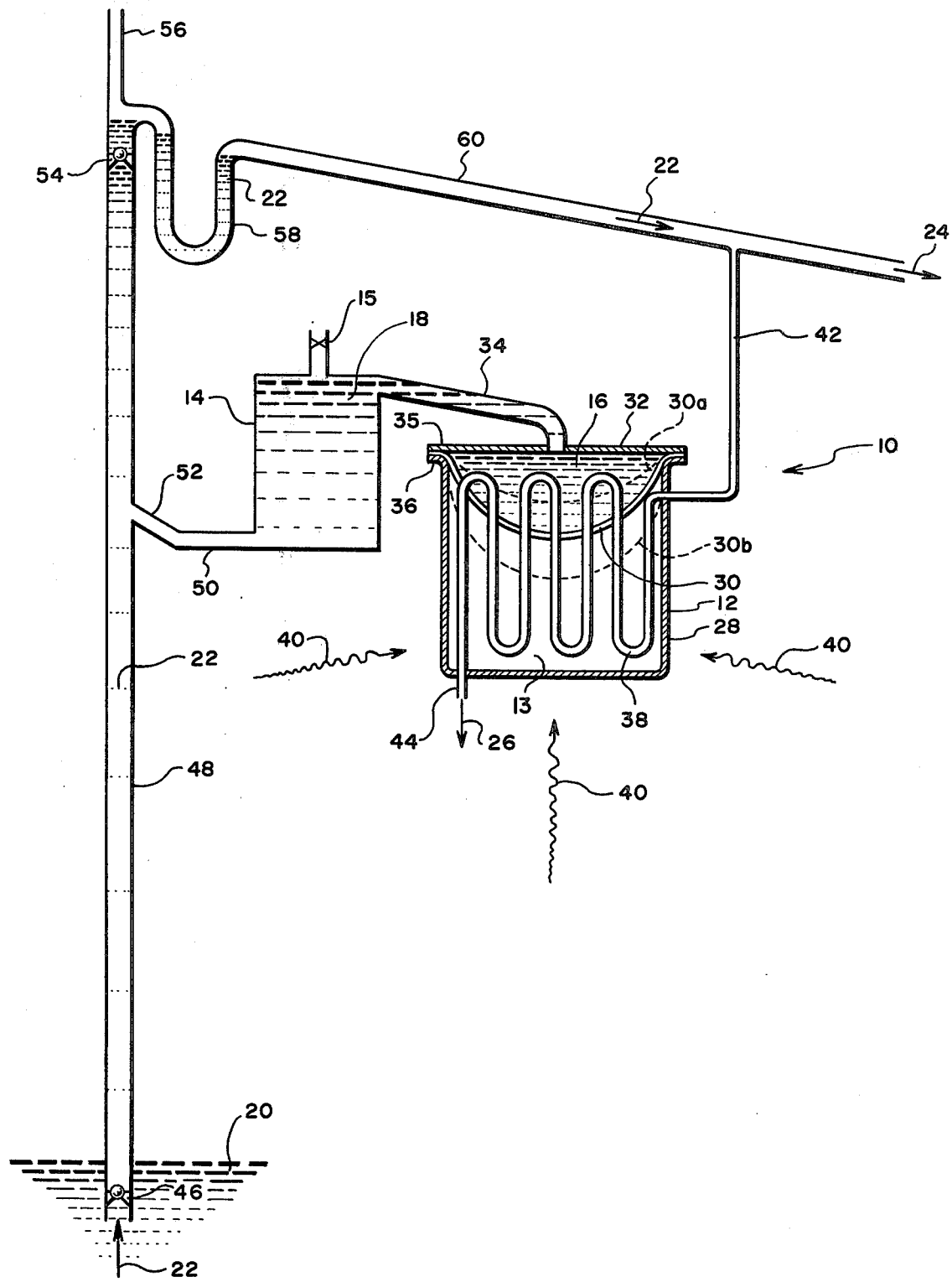

HEAT-POWERED WATER PUMP

BACKGROUND

1. Field of the Invention

This invention relates to water pumps and, more particularly, to heat-powered water pumps.

2. The Prior Art

Throughout the world there are many places where fuel and power are expensive because of limited fossil fuel deposits, transportation difficulties, extended electrical transmission lines, and the like. Even the production of electrical energy by diesel engines results in an excessive cost for electrical power when considered in light of the costs associated with the initial equipment purchase, fuel, transportation of the fuel, and repairs. In addition, projected fossil fuel shortages will result in continually increasing fuel costs.

However, cheap and abundant energy is necessary for a high material standard of living. It is only when humanity can multiply mechanical work many times beyond muscle power that enough goods and services can be produced to provide the economic conditions for a reasonably satisfactory standard of living. Although fuel and energy are reasonably available and at a relatively reasonable cost in the currently industrialized areas of the world, in the remote areas of the world the relatively high costs for fuel and energy, particularly electrical energy, substantially inhibits the further development of those portions of the world. For example, vast areas of the world are suitable for irrigation with relatively abundant sources of water being relatively readily available. However, these areas also require an economical technique for raising the water from a relatively shallow water table or nearby stream to the surface for irrigation. Most primitive devices for lifting this water include simple devices operated by one or two men or through the use of animal energy. However, animals consume food grown on irrigated land, part of which might otherwise be used for human food. Additionally, the use of manpower to pump water is particularly wasteful since man's labor can be more economically utilized in providing goods and services rather than mechanical energy.

Coincidentally, although there are many parts of the world where fuel and electrical power are expensive because of long distances from coal or oil deposits, transportation difficulties, or small-scale rather than large-scale operations, these same locations are also endowed with an abundance of available solar energy. On a comparative basis, solar energy does appear to be feasible in providing the necessary energy for the efficient pumping of water. Although solar energy is produced only while the sun is shining, pumping irrigation water, which involves no storage of power, offers a good area for the early use of solar energy. In these situations, the economic comparisons between solar energy and other energy sources appear to be sufficiently advantageous to encourage further research and development of solar energy. In addition, for those times when the sun is not shining, substitute thermal energy could be obtained from burning agricultural wastes such as stubble, chaff and the like.

Various types of water or fluid pumps operable from heat sources are shown in U.S. Pat. Nos. 2,050,391; 2,553,817; 2,688,922; 2,744,470; 2,757,618; 2,954,741; 2,973,715; 3,659,960; 3,765,799; and 3,790,305. However, the devices represented in each of the foregoing patents tend to be either complex, expensive to fabricate and maintain, or require excessive monitoring for efficient utilization in the less developed sections of the world.

In view of the foregoing, it would, therefore, be an advancement in the art to provide a heat-powered water pump which is operable to pump water from a relatively shallow location to an elevated location, the pump operating relatively independently of continuous monitoring and maintenance. In addition, it would be an advancement in the art to provide a heat-powered water pump which can utilize either solar energy or thermal energy from burning agricultural wastes. Such an invention is disclosed and claimed herein.

BRIEF SUMMARY AND OBJECTS OF THE INVENTION

The present invention relates to a heat-powered water pump and method which is relatively simple in construction and is readily adapted to pump water at a remote location with a minimal amount of maintenance and/or monitoring. Heat energy from either solar energy or combustion of agricultural wastes is used to vaporize a working fluid in a vessel. The working fluid expands against a flexible diaphragm to expel water from the vessel, thereby pumping the water. A temporary reservoir is located adjacent the upper outlet of the pump and, when filled, periodically siphoned empty. A portion of the siphoned water is diverted to the vessel to recondense the working fluid to develop a partial vacuum in the vessel to draw water into the pump prior to the next pumping cycle. Premature condensation of the working fluid by thermal contact between the working fluid vapor and the water is inhibited by maintaining a body of warmed water trapped between the diaphragm and the pumped water.

It is, therefore, a primary object of this invention to provide improvements in heat-powered water pumps.

Another object of this invention is to provide improvements in the method of pumping water with a heat-powered water pump.

Another object of this invention is to provide a heat-powered water pump which is adapted to cyclically pump water from a relatively shallow location to an elevated location.

Another object of this invention is to provide a heat-powered water pump wherein a portion of the pumped water is cyclically recirculated through the pumping chamber to condense the working fluid.

Another object of this invention is to provide a heat-powered water pump having a reservoir of warmed water interposed between the pumping chamber and the pumped water.

These and other objects and features of the present invention will become more fully apparent from the following description and appended claims taken in conjunction with the accompanying drawing.

BRIEF DESCRIPTION OF THE DRAWING

The drawing is a schematic illustration of the heat-powered water pump of this invention.

DETAILED DESCRIPTION OF THE PREFERRED EMBODIMENTS

The invention is best understood by reference to the drawing wherein like parts are designated with like numerals throughout.

With particular reference to the drawing, the heat-powered water pump of this invention is shown generally at 10, and includes a vessel 12, a surge reservoir 14, a pipe 48 immersed in water 20 and with check valves 46 and 54, discharge tube 60, heat exchanger 38 and a siphon reservoir 58. Vessel 12 encloses a flexible, pumping diaphragm 30 and diaphragm 30 segrates vessel 12 into a pumping chamber 16 and an expansion or working chamber 13. The upper end of vessel 12 is closed by a closure 32 in fluid communication with surge reservoir 14 through a conduit 34.

The working fluid is a predetermined quantity of a low-boiling point liquid such as a cyclopentane (boiling point 50° C.). The relatively low boiling point working fluid in working chamber 13 means that a relatively low quantity of heat (shown schematically herein as heat arrows 40) is required to volatilize the working fluid and thereby increase the vapor pressure within working chamber 13. The increased vapor pressure in working chamber 13 forces flexible diaphragm 30 toward closure 32 thereby expelling water from pumping chamber 16. It is, of course, understood that the materials for diaphragm 30 and the working fluid are selected from known materials which are sufficiently compatable to preclude chemical attack on diaphragm 30 by either the working fluid or the water. This movement of diaphragm 30 toward closure 16 decreases the volume of pumping chamber 16 thereby forcing water through conduit 34 into surge reservoir 14 where it displaces water out conduit 50 and upwardly through valve 54.

The relative positions of diaphragm 30 are illustrated in broken lines as expanded position 30a and retracted position 30b. Condensation of the working fluid in working chamber 13 creates a partial vacuum moving flexible diaphragm 30 from expanded position 30a to retracted position 30b thereby creating a partial vacuum in pumping chamber 16. The partial vacuum in pumping chamber 16 allows atmospheric pressure over water source 20 to force water 22 upwardly through check valve 46 until the pressures within vessel 12 are substantially equalized. The repeated application of heat 40 to vessel 12 and, more particularly, working chamber 13 results in volatilization of the working fluid therein and a repetition of the pumping cycle.

Water 22 is forced upwardly through check valve 54 and collects in U-shaped siphon reservoir 58. Siphon reservoir 58 is filled and then siphoned empty by the water passing through the downwardly directed discharge tube 60. An open vent 56 provides the necessary opening to the atmosphere to accommodate the siphon action set forth.

A portion of the water 22 in discharge tube 60 is diverted through a conduit 42 where it passes in heat exchange relationship through heat exchange coils 38 in working chamber 13 as cooling water 26. Water 26 absorbs heat energy from the working fluid in working chamber 13 resulting in the condensation of the same. The diverted cooling water 26 is discharged as warm water through an outlet 44. The remainder of pumped water 22 is discharged for culinary or irrigation use as water 24.

Surge reservoir 14 includes an upwardly located fill valve 15 to accommodate the initial filling with water of surge reservoir 14 and pumping chamber 16 to prime pump 10. It should be noted that the conduit 34 interconnecting surge reservoir 14 with pumping chamber 16 is located adjacent the upper end of surge reservoir 14 while conduit 50 is located adjacent the lower end.

The purpose for this orientation of interconnection with conduits 34 and 50 is to trap a volume of warmed water 18 in surge reservoir 14 and thereby preclude the excessive condensation of working fluid in working chamber 13 by thermal contact with cold water through diaphragm 30. In effect, therefore, warm water 18 in surge reservoir 14 acts as a warm water "buffer" between the cold water 22 and the water in pumping chamber 16. Air rising in pipe 48 with water 22 is inhibited from entering surge tank 14 by the downwardly slanted orientation of conduit section 52 of conduit 50. Any entrapped air in surge tank 14 can be purged through valve 15.

In operation, heat 40 may be, advantageously, supplied by directing solar energy against the outer walls of vessel 12 by means of a suitable solar reflector (not shown) or the like. Additionally, heat-powered water pump 10 may be used in areas where there is an abundance of agricultural wastes which may be burned under vessel 12 to supply the necessary heat 40.

It should, therefore, be readily apparent that the present invention provides a relatively inexpensive, maintenance-free and relatively reliable pump for pumping water at remote locations with a minimum of monitoring and/or maintenance. The relatively low quantities of heat required (about 300–500 watts) should be adequate to pump about 50 gallons of water per hour to an estimated elevation of between 10 and 20 feet.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a United States Letters Patent is:

1. A heat-powered water pump for cyclically pumping water from a lower level to a higher level comprising:
   an inlet submerged in the water at the lower level and having a first check valve to inhibit reverse flow of water to the lower level;
   an outlet above the higher level and having a second check valve to inhibit reverse flow of water therethrough;
   a conduit interconnecting the inlet with the outlet;
   a surge tank interconnected with the conduit at a lower outlet in the surge tank;
   a pumping chamber interconnected to the surge tank at an upper outlet in the surge tank, the pumping chamber comprising:
      a vessel;
      a cover for the vessel, the cover having a port therein for interconnection with the upper outlet of the surge tank;
      an impervious, flexible diaphragm clamped between the cover and the vessel thereby forming a pumping cavity between the diaphragm and the cover and an expansion chamber between the diaphragm and the vessel; and
      condensation means in the expansion chamber to remove heat from a vapor therein causing the vapor to become a condensed liquid; and a siphon tube interconnected with the outlet and comprising a U-shaped tube opening into a downwardly directed discharge tube.

2. The apparatus defined in claim 1 wherein the condensation means comprises a heat exchanger apparatus in the expansion chamber and a conduit for diverting a portion of the water from the discharge tube through the heat exchanger apparatus.

3. An apparatus for pumping water comprising:
a vessel;
a working fluid in the vessel;
a flexible disphragm in the vessel to isolate the working fluid in the vessel;
a closure for the vessel to seal the diaphragm in the vessel;
water conduit means interconnected with the closure and having a lower, inlet adapted to be immersed in a body of water and an upper, outlet, the water conduit means having inlet and outlet check valve means;
vaporization means for vaporizing the working fluid to create vapor pressure in the vessel to force the diaphragm toward the closure and expel water from the vessel, the expelled water being discharged through the outlet check valve means;
a U-shaped siphon tube, the siphon tube receiving water pumped through the outlet check valve and serving as a siphon reservoir which is cyclically siphoned empty when filled; and
condensation means comprising heat exchange means for directing a portion of the expelled water in heat exchange relationship with the working fluid thereby removing thermal energy from the working fluid vapor to condense the same and thereby create a partial vacuum in the vessel to allow atmospheric pressure to force water from the body of water through the inlet check valve means into the water conduit means.

4. The apparatus defined in claim 3 wherein a portion of the fluid siphoned from the U-shaped siphon tube is diverted through the vessel as a coolant for the condensation means.

5. The apparatus defined in claim 3 wherein the vaporization means comprises a vessel adapted to be exposed to a heat source selected from the group consisting of a solar heat means and a combustion source.

6. An apparatus for pumping water comprising:
a vessel;
a working fluid in the vessel;
a flexible diaphragm in the vessel to isolate the working fluid in the vessel;
a closure for the vessel to seal the diaphragm in the vessel;
water conduit means interconnected with the closure and having a lower, inlet adapted to be immersed in a body of water and an upper, outlet, the water conduit means having inlet and outlet check valve means;
a surge tank interposed in the water conduit means between the inlet check valve means and the closure, the surge tank forming a retention reservoir for warmed water by having a lower opening adjacent the bottom of the tank connected with said water conduit means and an upper opening adjacent the top of the tank connected with said closure thereby entrapping warmed water in the surge tank above the lower opening;
vaporization means for vaporizing the working fluid to create vapor pressure in the vessel to force the diaphragm toward the closure and expel water from the vessel, the expelled water being discharged through the outlet check valve means; and
condensation means comprising heat exchange means for directing a portion of the expelled water in heat exchange relationship with the working fluid thereby removing thermal energy from the working fluid vapor to condense the same and thereby create a partial vacuum in the vessel to allow atmospheric pressure to force water from the body of water through the inlet check valve means into the water conduit means.

7. The apparatus defined in claim 6 wherein the lower opening is interconnected with the water conduit means through an upwardly slanted conduit, the upward slant inhibiting gaseous bubbles originating at the body of water from entering the surge tank.

8. The apparatus defined in claim 6 wherein the vaporization means comprises a solar heat means.

9. The apparatus defined in claim 6 wherein the vaporization means comprises a vessel adapted to be exposed to a combustion source as a heat source.

10. A method for pumping water comprising:
isolating a volatile fluid in a vessel by securing a flexible diaphragm across an end of the vessel;
closing the vessel with a closure, the closure having water conduit connection therein;
interconnecting the water conduit connection with a water pipe, the water pipe having an inlet check valve adjacent a lower end and an outlet check valve adjacent an upper end;
immersing the lower end of the water pipe in a body of water;
heating the volatile fluid in the vessel thereby generating vapor pressure and forcing the flexible diaphragm toward the closure expelling water from between the diaphragm and closure through the water conduit connection, water pipe and upwardly through the outlet check valve;
creating a suction in the water pipe by collecting the expelled water in a U-shaped siphon tube while periodically siphoning the collected water into a discharge conduit and diverting a portion of the siphoned water into heat exchange relationship with the volatile fluid thereby condensing the volatile fluid and thereby drawing a partial vacuum against the diaphragm, the suction allowing water to be forced by atmospheric pressure upwardly through the inlet check valve into the water pipe.

11. The method of claim 10 wherein the interconnecting step further comprises interposing a surge reservoir between the water conduit connection and the water pipe, the surge reservoir having an upper connection with the water conduit connection and a lower connection with the water pipe, the relative orientations of the connections with the surge reservoir isolating a body of warmed water in contact with the flexible diaphragms thereby decreasing condensation of the volatile fluid by heat exchange across the flexible diaphragm with the water on the opposite side.

12. The method of claim 10 wherein the interconnecting step further comprises inhibiting the entry of gaseous bubbles into the water between the flexible diaphragm and the closure by upwardly directing the interconnection with the water pipe.

13. The method of claim 10 wherein the heating step comprises subjecting the vessel to heat from a combustion source.

14. The method of claim 10 wherein the heating step comprises subjecting the vessel to a concentration of solar flux.

* * * * *